US008621944B2

(12) United States Patent
Stein

(10) Patent No.: US 8,621,944 B2
(45) Date of Patent: Jan. 7, 2014

(54) ACTUATED SEPTA AND SYSTEMS AND METHODS USING THE SAME

(75) Inventor: David Stein, Succasunna, NJ (US)

(73) Assignee: Siemens Healthcare Diagnostics Inc., Tarry Town, NY (US)

(*) Notice: Subject to any disclaimer, the term of this patent is extended or adjusted under 35 U.S.C. 154(b) by 515 days.

(21) Appl. No.: 12/596,213

(22) PCT Filed: Apr. 14, 2008

(86) PCT No.: PCT/US2008/060180
§ 371 (c)(1), (2), (4) Date: Oct. 16, 2009

(87) PCT Pub. No.: WO2008/130880
PCT Pub. Date: Oct. 30, 2008

(65) Prior Publication Data

US 2010/0107784 A1 May 6, 2010

Related U.S. Application Data

(60) Provisional application No. 60/912,338, filed on Apr. 17, 2007.

(51) Int. Cl.
*G01N 1/10* (2006.01)

(52) U.S. Cl.
USPC ...................... 73/863.85; 73/864.14; 422/570

(58) Field of Classification Search
USPC .............. 73/864.01, 864.14, 863.85; 422/570
See application file for complete search history.

(56) References Cited

U.S. PATENT DOCUMENTS

| | | | | |
|---|---|---|---|---|
| 5,637,099 | A * | 6/1997 | Durdin et al. | 604/192 |
| 6,146,362 | A * | 11/2000 | Turnbull et al. | 604/256 |
| 6,361,744 | B1 | 3/2002 | Levy | |
| 7,163,525 | B2 | 1/2007 | Franer | |
| 7,309,469 | B2 * | 12/2007 | Anderson et al. | 422/550 |
| 8,034,272 | B2 * | 10/2011 | Pavlovic et al. | 264/153 |
| 2003/0036735 | A1 * | 2/2003 | Jepson et al. | 604/247 |
| 2004/0245260 | A1 * | 12/2004 | Rohr et al. | 220/785 |
| 2008/0132877 | A1 * | 6/2008 | McKinnon et al. | 604/500 |

OTHER PUBLICATIONS

International Search Report from PCT Application No. PCT/US08/60180.

* cited by examiner

*Primary Examiner* — Hezron E Williams
*Assistant Examiner* — Nashmiya Fayyaz

(57) ABSTRACT

A device, system, and method for passively sealing a vessel containing a fluid and for sampling the fluid without carry-over or cross-contamination between the fluid sampling device, the sealing septum, and the vessel contents. The device includes an actuated septum having a plurality of septum fingers, to passively seal the vessel, and an actuation device, to open the passive seal without carry-over or cross-contamination. Each of the plurality of septum fingers includes a corresponding rib portion. The actuation device can be an actuation ring having an annulus. The plurality of septum fingers and corresponding rib portions are disposed internal or substantially internal to the vessel, while the actuation device is disposed external to the vessel.

7 Claims, 3 Drawing Sheets

ACTUATED SEPTA AND SYSTEMS AND METHODS USING THE SAME

CROSS REFERENCE TO RELATED APPLICATIONS

The right to priority to U.S. Provisional Patent Application No. 60/912,338 filed on Apr. 17, 2007 and entitled "Actuated Septum" is hereby asserted.

STATEMENT REGARDING FEDERALLY SPONSORED RESEARCH OR DEVELOPMENT

Not Applicable

BACKGROUND OF THE INVENTION

The present invention relates generally to septa that are adapted to seal vessels containing fluids and, more particularly, to actuated septa that reduce cross-contamination between fluid transfer devices, the septa, and the vessel contents and to systems using the same.

Septa are elastomeric, plastic, and/or metallic barriers positioned at the opening of a vessel, e.g., a fluid-containing vessel, that provide a seal between the vessel contents and the ambient environment. Septa serve a myriad of purposes, chief of which are: preventing contamination of the vessel contents and mitigating evaporation of the vessel contents.

To access vessel contents using a conventional septum-sealed container, a fluid transfer device, such as a sampling probe or hollow cannulus, pierces the seal and/or pushes open septum "fingers" that passively seal the opening of the vessel. U.S. Pat. No. 5,209,737 to Ritchart, et al. discloses septa having actuation mechanisms that include a plurality of levers radially disposed about a frame. The levers include a pair of wings. The wings are structured and arranged so that as a sampling probe is inserted into the septum, the probe forces open the levers and wings, allowing the probe access to the inner end of a surgical trocar.

However, when the sampling probe or hollow cannulus is used to push open septum fingers, the potential for carry-over and cross-contamination between the probe or cannulus, the septum, and the vessel contents increases. Therefore, it would be desirable to provide septa having a passive, "self-healing" closure, and to eliminate such carry-over or cross-contamination. More particularly, it would be desirable to provide actuated septa that include an actuator that precludes the fluid transfer device from having to pierce the septum.

BRIEF SUMMARY OF THE INVENTION

A device, system, and method for passively sealing a vessel containing a fluid and for sampling the fluid without carry-over or cross-contamination between the fluid sampling device, the sealing septum, and the vessel contents is disclosed. The device includes an actuatable septum having a plurality of septum fingers, to passively seal the vessel, and an actuation device, to open the passive seal without carry-over or cross-contamination of the fluid sampling device. Each of the plurality of septum fingers includes a corresponding rib portion. The actuation device can be an actuation ring having an annulus. The plurality of septum fingers and corresponding rib portions are disposed internal or substantially internal to the vessel, while the actuation device is disposed external to the vessel.

The system includes a fluid transfer device, e.g., a hollow cannulus, a sampling probe, and the like, for adding fluid to or removing fluid from the vessel, the actuatable septum, means for depressing the actuation device against the ribs of the plurality of septum fingers, to break the passive seal and provide an opening into the vessel through the septum, and control means for controlling the means for depressing the actuation device and for introducing into, positioning within, and withdrawing the fluid sampling device from the vessel.

The method includes sealing the vessel with the actuatable septum; depressing the actuation device against the ribs of the plurality of septum fingers, causing the septum fingers to move downward, out and away from the passive seal, to provide an opening; introducing a fluid sampling device through an annulus in the actuation device and the opening; sampling the fluid through the fluid sampling device; removing the fluid sampling device from the opening; and removing the actuation device from against the ribs, allowing the plurality of septum fingers to close and passively re-seal the vessel.

BRIEF DESCRIPTION OF THE SEVERAL VIEWS OF THE DRAWING

The invention will be more fully understood with reference to the following Detailed Description of the Invention in conjunction with the Drawings of which.

DETAILED DESCRIPTION OF THE INVENTION

Figure 1:
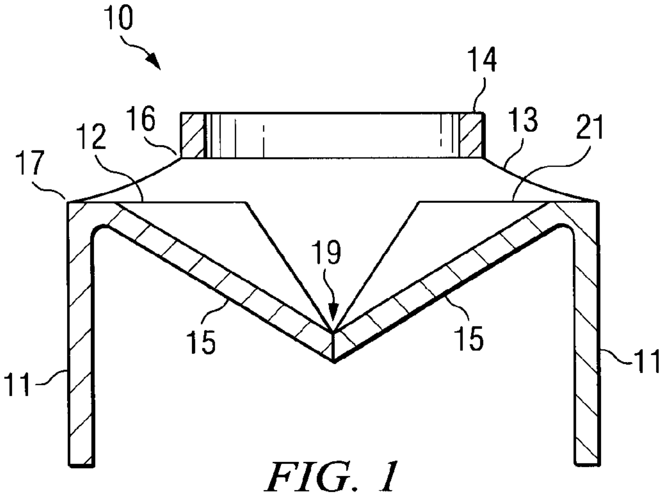
FIG. 1 is a cross-sectional view showing an actuated septum in a passive seal state in accordance with the present invention.
Figure 2:
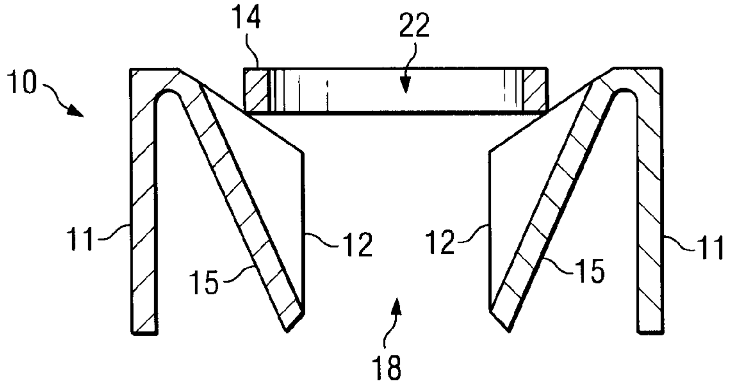
FIG. 2 is a cross-sectional view showing an actuated septum in an unsealed state in accordance with the present invention.

U.S. Provisional Patent Application No. 60/912,338 filed on Apr. 17, 2007 and entitled "Actuated Septum" from which priority is claimed is incorporated in its entirety herein. An illustrative actuatable septum 10 for use in sealing a cylindrical vessel is shown in FIG. 1 and FIG. 2. The septum 10 shown in FIG. 1 shows the septum 10 in a passive seal state. The septum 10 shown in FIG. 2 shows the septum 10 in an unsealed state.

The septum 10 is an elastomeric or plastic device that includes an outer ring portion 11, a flexible neck portion 13, a plurality of septum fingers 15, and an actuation ring 14. Although the term "ring" connotes a circle structure, the actuation ring 14 can be any circular or polygonal shape that includes a central annulus 22.

The outer ring portion 11 is structured and arranged to fit snugly in the neck portion of a sample-containing vessel (not shown), to provide a tight, interference fit between the sample-containing vessel and the ambient atmosphere. The flexible neck portion 13 is connected to the actuation ring 14 at an upper end 16 and to the outer ring portion 11 at a lower end 17. Although FIG. 1 and FIG. 2 show a septum 10 having the actuation ring 14 connected to the outer ring portion 11 by the flexible neck portion 13 in a unitary construction, those of ordinary skill in the art can appreciate that the actuation ring 14 and septum 10 can be separate structures (as will be described in greater detail below).

The septum fingers 15 are elongate, elastomeric or plastic portions that are structured and arranged to provide a passive seal when in a passive seal state (FIG. 1) and, moreover, to provide an opening 18 for accessing the contents of the sampling-containing vessel when in an unsealed state (FIG. 2). The septum fingers 15 can be cantilevered from the outer ring portion 11 into a natural, at-rest position. Although FIG. 1 and FIG. 2 show the septum fingers 15 joined at the top of the outer ring portion 11, the point of juncture can be anywhere along the length of the outer ring portion 11.

In the natural, at-rest position ("passive seal state"), each septum finger 15 is capable of supporting its own weight with a negligible deflection at the center of the passive seal 19 and along the finger 15 edges. More specifically, in the passive seal state, each septum finger 15 is biased so that, absent any applied forces to the actuation ring 14 or to the septum finger 15 itself, each septum finger 15 is in contact with adjacent septum fingers 15 to provide a passive seal.

Figure 5:
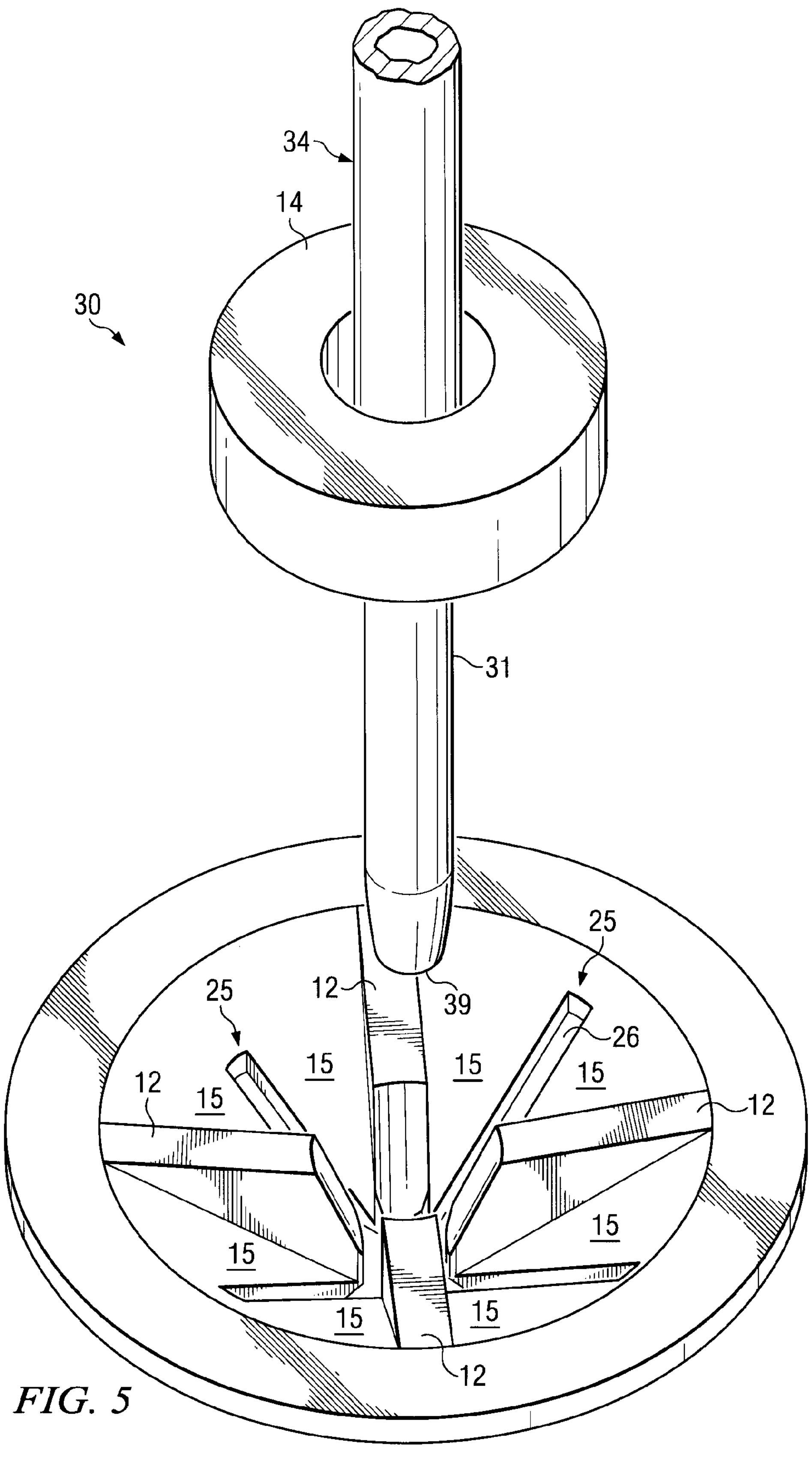
FIG. 5 is an isometric view of the sampling system of FIG. 4A.

Referring to FIG. 5, an embodiment having four septum fingers 15 is shown. Those skilled in the art can appreciate that the septa 10 can include more or fewer fingers 15 than those shown. Slits 25 (whose widths are over-exaggerated in FIG. 5 for illustrative purposes) are provided between adjacent fingers 15. Theses slits 25 can be razor thin discontinuities between adjacent fingers 15 whereby the adjacent fingers 15 abut along the respective slit 25, thereby forming a tight seal along the length of the slit 25. Alternatively, the slits 25 can have a wider dimension, in which case, each finger 15 can include a flexible flap 26 that will provide a tight seal when in the passive seal state. In the passive seal state, the flap 26 of one of the adjacent fingers 15 can be above, below or partially above and partially below the flap 26 of the other adjacent finger 15.

Each septum finger 15 is also connected to or includes an organic or integrated rib 12. Although FIG. 1 shows the flexible neck portion 13 connected to the outer ring portion 11 at a lower end 17, alternatively, the flexible neck portion 13 can be connected to the upper ridge portion 21 of the ribs 12.

In a passive seal state, the septum fingers 15 and corresponding ribs 12 are disposed internal or substantially internal to the cylindrical vessel, while the actuation ring 14 is disposed external or substantially external to the cylindrical vessel. In an unsealed state, the actuation ring 14 is pushed into the ribs 12, forcing the septum fingers 15 to rotate downward, out and away from the center of the passive seal 19, to create an opening 18. The opening 18 and the annulus 22 of the actuation ring 14 provide a sampling path into which a fluid sampling device 34 can be inserted and retracted freely without carry-over or cross-contamination between the vessel contents, the septum 10, and/or the fluid sampling device 34.

After a desired volume of fluid has been sampled from the cylindrical vessel and the fluid sampling device 34 withdrawn from the opening 18 and the annulus 22, force on the actuation ring 14 can be removed. With the force removed, the passive nature of the septum fingers 15 causes the fingers 15 to return to their natural, passive seal state, producing a passive seal again.

Having described an actuated septum 10, a method of accessing the contents of a passively-sealed cylindrical vessel using the same will be described. In a first step, an external actuation ring is depressed against a surface, e.g., the corresponding ribs, of the septum fingers (STEP 1) that produce the passive seal. The actuation ring can be depressed mechanically, e.g., using a stepper motor that is capable of moving the actuation ring up and down, and/or magnetically or electromagnetically, e.g., using a permanent magnet or electromagnet.

The applied force of the actuation ring is sufficient to cause the septum fingers to move downward, out and away from the center of the passive seal. Once the septum fingers have moved sufficiently downward, out and away from the center of the passive seal, a fluid sampling device can be inserted into the vessel (STEP 2). More specifically, the fluid sampling device can be inserted into the vessel, through the annulus of the actuation ring and through the opening created by the rotational displacement of the septum fingers (STEP 2).

The fluid sampling device can then be positioned for sampling the vessel contents. Once a desired volume of the contents of the vessel has been taken by the fluid sampling device (STEP 3), the fluid sampling device can be withdrawn from the vessel (STEP 4). Finally, the force applied to the actuation ring is removed (STEP 5), causing the septum fingers and corresponding ribs to return to their natural, passive seal state.

Figure 3:
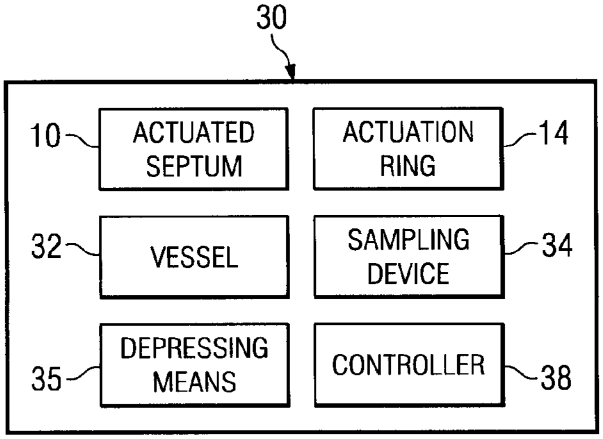
FIG. 3 shows a block diagram of an illustrative sampling system in accordance with the present invention.
Figure 4A:
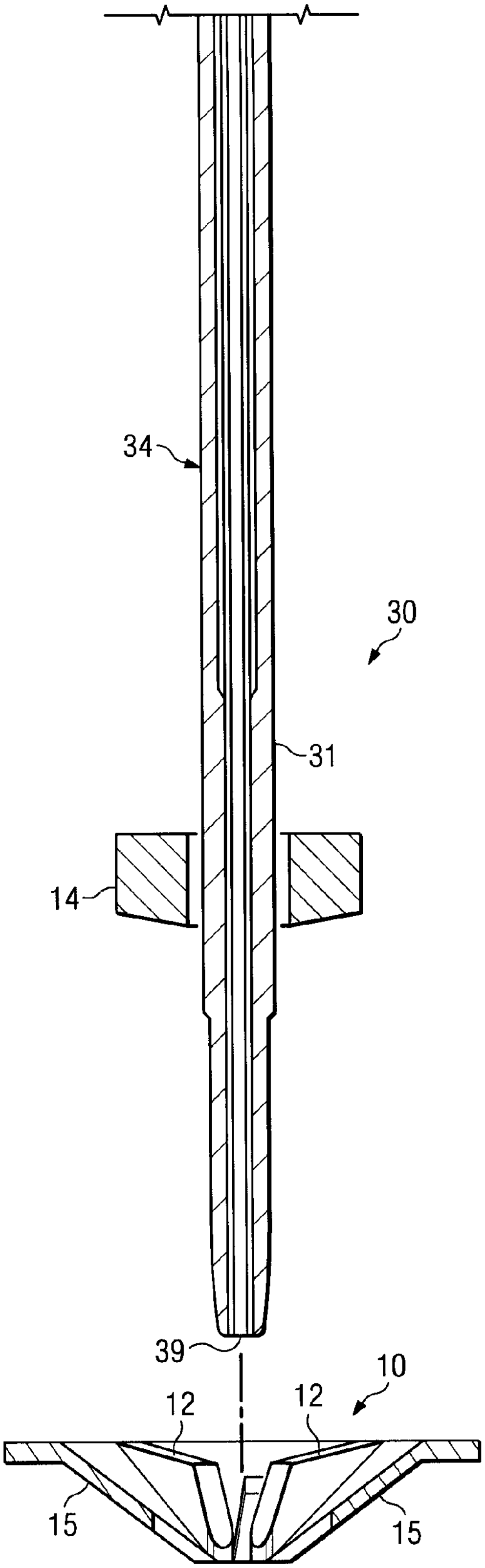
FIG. 4A is a cross-sectional view showing a sampling system having an actuated septum in a passive seal state, an actuation ring, and a sampling device in accordance with the present invention.
Figure 4B:
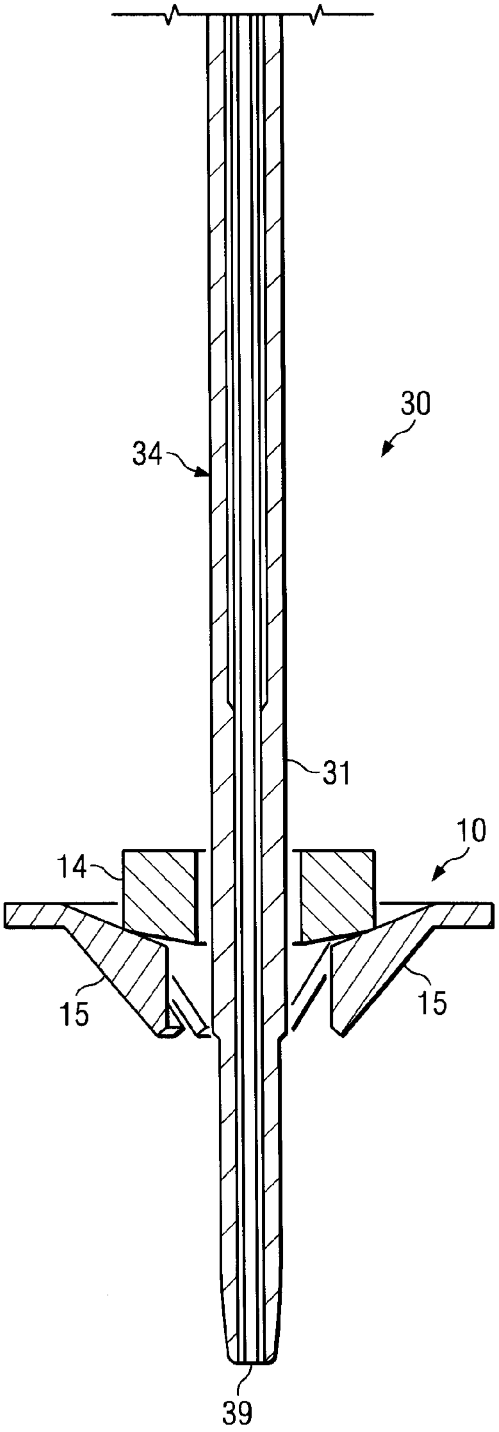
FIG. 4B is a cross-sectional view showing the sampling system of FIG. 4A in an unsealed state in accordance with the present invention.

Having described a method of accessing the contents of a septum-sealed cylindrical vessel, a fluid sampling system for accessing the contents of a septum-sealed cylindrical vessel will now be described. A block diagram of the system 30 is shown in FIG. 3. FIG. 4A, FIG. 4B, and FIG. 5 provide cross-sectional and isometric views of the illustrative system 30.

The system 30 includes at least one septum-sealed cylindrical vessel 32, an actuated septum 10, an actuation ring 14, means 35 for depressing the actuation ring, and a fluid sampling device 34. The actuated septum 10 can be of a type described above, i.e., of unitary construction including the actuation ring 14. Alternatively, as shown in FIG. 4A, FIG. 4B, and FIG. 5, the septum 10 and actuation ring 14 can be separate structures. The fluid sampling device 34 can be, for example, a sampling probe, a hollow cannulus, and the like.

The means 35 for depressing the actuator ring 14 of the actuated septum 10, can be any mechanical, magnetic, and/or electro-mechanical device that is adapted to depress or otherwise force the actuator ring 14 against the corresponding ribs 12 of the septum fingers 15, causing the septum fingers 15 to move downward into the cylindrical vessel 32, out and away from the center of the passive seal provided by the septum 10 in its natural, passive seal state. The means 35 can include a reciprocating arm(s) (not shown) that can move the actuation ring 14 up or down in the central axis of the septum 10 and the vessel 32, to engage or disengage from the ribs 12 of the septum fingers 15.

Alternatively, the means 35 can include a projection or protrusions (not shown) that are disposed on the circumferential surface 31 of the fluid sampling device 34. The projection or protrusion is structured and arranged to engage the actuation ring 14 and to depress or force the actuation ring 14 into the septum fingers 15 before the tip 39 of the fluid sampling device 34, as it is being lowered towards the vessel, would otherwise make contact with any portion of the ribs 12 or fingers 15. For example, the projection or protrusion could be cone-shaped with the larger opening of the cone disposed near the tip 29 at the distal end of the fluid sampling device 34. The means 35 can also include magnetic or electromagnetic means for moving the actuation ring 14 into or away from the ribs 12 of the septum fingers 15.

The system 30 further includes control means 38 for controlling the means 35 for depressing the actuation ring 14; for controlling the introduction, advancement, and withdrawal of the fluid sampling device 34 after an opening 18 in the actuated septum 10 has been created; and for controlling sampling of the contents by the fluid sampling device 34.

For example, when a protrusion or projection from the circumferential surface of the fluid sampling device is used, the control means 38 can include a sensor (not shown) and/or an arresting means (not shown). The arresting means is adapted to arrest further advancement of the protrusion or projection into the vessel 32 only after sensing or otherwise determining that a sufficient sized opening 18 was created (or should have been created based on the altitude of the protrusion or projection with respect to the altitude of the septum 10), while simultaneously allowing the fluid sampling device 34 to advance to any desired position within the vessel 32.

The control means 38 can include a processor or microprocessor that includes software- or hardware-based applications or driver programs to control various stepper motors, vacuum pumps, and the like (not shown), to control the timing of the breaking of the passive seal, the insertion of the fluid sampling device, the sampling of the vessel contents, the withdrawal of the fluid sampling device, and the re-sealing of the septum. Optionally, the control means 38 can also include software- or hardware-based applications or driver programs for cleaning the tip of the fluid sampling device; for removing and installing disposable tips on the tip of the fluid sampling device; and/or for placing the fluid sample into another vessel.

Although the invention has been described in connection with a cylindrical vessel, the invention is not to be construed as being limited thereto. For example, the vessels could be other than cylindrical. Those of ordinary skill in the art will appreciate that variations to and modification of the above-described device, system, and method. Accordingly, the invention should not be viewed as limited except as by the scope and spirit of the appended Claims.

What is claimed is:

1. A system for sealing a vessel containing a fluid and for providing contamination-free sampling of the fluid from the vessel, the vessel having an opening into the vessel interior, the system comprising:

a fluid transfer device for adding to or removing the fluid from the vessel;

an actuatable septum for sealing the vessel, the septum comprising:

an outer ring portion to provide a tight, interference seal between the actuatable septum and an outer surface of the opening of the vessel, and at least three septum fingers that are cantilevered from the outer ring portion, the septum fingers in a natural state producing a passive seal, each of the septum fingers having a corresponding upwardly projecting rib portion, the septum fingers and corresponding upwardly projecting rib portions being disposed internal or substantially internal to the vessel;

a substantially ring-shaped actuation device disposed external to the vessel and adapted for selective engagement with the upwardly projecting rib portions of the septum fingers, wherein engagement between the actuation device and the upwardly projecting rib portions of the septum fingers results in a deflection of the septum fingers; and a flexible, skirt-like neck portion encircling and connecting the actuation device with the outer ring portion.

2. The system as recited in claim 1, wherein the fluid transfer device is selected from the group consisting of a hollow annulus or a sampling probe.

3. The system as recited in claim 1, wherein the fluid transfer device and actuation device are structured and arranged coaxially with the fluid transfer device disposed inside of an annulus of the actuation device.

4. The system as recited in claim 1, further comprising:

means for depressing the actuation device against the upwardly projecting ribs of the septum fingers, to break the passive seal and to provide an opening into the vessel through the actuatable septum.

5. The system as recited in claim 4, further comprising:

control means for controlling the means for depressing the actuation device and for introducing, advancing, and withdrawing the fluid transfer device into or from the vessel.

6. A method of sampling a fluid from a passively sealed vessel with reduced carry-over or cross contamination, the vessel having an opening into the vessel interior, the method comprising:

sealing the vessel with an actuatable septum having a central axis, the actuatable septum comprising:

an outer ring portion to provide a tight, interference seal between the actuatable septum and an outer surface of the opening of the vessel, and at least three septum fingers that are cantilevered from the outer ring portion, the septum fingers in a natural state producing a passive seal, each of the septum fingers having a corresponding upwardly projecting rib portion, the septum fingers and corresponding upwardly projecting rib portions being disposed internal or substantially internal to the vessel;

depressing a substantially ring-shaped actuation device connected to the outer ring portion by a flexible, skirt-like neck portion, the actuation device being disposed external to the vessel and adapted for selective engagement with the upwardly projecting rib portions of the septum fingers, against said upwardly projecting rib portions of the septum fingers, causing said septum fingers to deflect, to provide an opening in the actuatable septum;

introducing a fluid sampling device through an annulus in the actuation device and the opening in the actuatable septum;

sampling the fluid through the fluid sampling device;

removing the fluid sampling device from the opening in the actuatable septum; and removing the actuation device from against the upwardly projecting rib portions, allowing the septum fingers to close and passively re-seal the vessel.

7. The method as recited in claim 6, wherein depressing the actuation device includes translating the actuation device in the central axis of the actuatable septum mechanically, magnetically or electromechanically.

* * * * *